United States Patent [19]

Holdeman

[11] 4,440,042

[45] Apr. 3, 1984

[54] HELICAL PLANETARY GEAR ASSEMBLY

[75] Inventor: John W. Holdeman, Muncie, Ind.

[73] Assignee: Borg-Warner Corporation, Chicago, Ill.

[21] Appl. No.: 287,962

[22] Filed: Jul. 29, 1981

[51] Int. Cl.³ .............................................. F16H 3/44
[52] U.S. Cl. ......................................... 74/785; 74/769
[58] Field of Search ................... 74/785, 750 R, 768, 74/769, 786

[56] References Cited

U.S. PATENT DOCUMENTS

| | | | |
|---|---|---|---|
| 311,255 | 1/1885 | Pedersen | 74/785 |
| 1,430,799 | 10/1922 | Davis | 74/785 |
| 1,611,118 | 12/1926 | Lanquetin | 74/785 |
| 2,066,952 | 1/1937 | Tornebohm | 74/287 |
| 2,959,070 | 11/1960 | Flinn | 74/785 |
| 3,477,314 | 11/1969 | Rutkowski | 74/750 |
| 4,063,470 | 12/1977 | Kelbel | 74/750 R |
| 4,083,421 | 4/1978 | Van Horn et al. | 74/750 R |
| 4,092,878 | 6/1978 | Campbell | 74/750 R |
| 4,189,960 | 2/1980 | Holdeman | 74/750 R |
| 4,286,480 | 9/1981 | Dickie | 74/785 |
| 4,347,762 | 9/1982 | Holdeman | 74/785 |

FOREIGN PATENT DOCUMENTS

| | | | |
|---|---|---|---|
| 319521 | 7/1934 | Italy | 74/785 |
| 319522 | 7/1934 | Italy | 74/785 |

Primary Examiner—Leslie A. Braun
Assistant Examiner—Joseph M. Rolnicki
Attorney, Agent, or Firm—Julian Schachner

[57] ABSTRACT

A helical planetary gear assembly which is particularly adapted for use in a vehicle drive mechanism such as a four-wheel drive transfer case. The reaction member (ring gear) is rigidly secured to the housing; the input member (sun gear) is axially and radially located by a bearing; and the output member (planet carrier) is axially restrained but radially free to float. In direct drive the input and output are connected directly and the gears are unloaded, thus avoiding vibration and wear commonly experienced when running in reduction drive. The assembly requires only one mesh point when shifting to either the direct or reduction drive mode.

9 Claims, 4 Drawing Figures

NEUTRAL

HIGH

LOW

HELICAL PLANETARY GEAR ASSEMBLY

BACKGROUND OF THE INVENTION

This invention relates generally to a planetary gear assembly. More particularly it relates to a helical planetary gear assembly which may be used in the transfer case of a modern four-wheel drive vehicle.

When a four-wheel drive vehicle is operated off-highway, it requires a reduction unit having a gear ratio lower than that required for on-highway use. This is in order to provide reduced vehicle speed, improved gradeability, and ease of traverse over adverse terrain. A lower ratio also is required to keep engine speed sufficiently high for adequate fan cooling under slow running conditions.

The typical reduction unit incorporates either a layshaft gear set or a planetary gear set. As compared with a conventional layshaft gear set, a planetary gear set is preferable in that it affords lighter weight, compactness, reduced size, and improved efficiency and durability. These features are becoming increasingly desirable as the cost of energy and equipment increases.

Further, it is accepted practice today to provide a vehicle with an engine of reduced size. In such a case, an associated reduction unit would be used extensively, even at relatively high speeds. Where a reduction unit using spur gears, which are inherently noisy, heretofore was acceptable, it is now preferable to use helical gears in order to provide quieter operation.

For these and other reasons, there has developed in the art a need for a reduction unit incorporating a planetary gear set with helical gear teeth. However, in a helical planetary gear set the sun and ring gear helix angles generate thrust loads which are difficult to contain. This is particularly so where a gear set rotates as a unit in the direct drive mode. It is important that these thrust loads be contained. It also is important that the gears not be loaded when a planetary gear set is operated for long periods in the direct drive mode so as to avoid wearing flats on the gear teeth contacts, and thus reduce noise and vibration when operation is in the reduction drive mode. Finally, it is important to have a construction which permits the gears to seek centers for the best sharing of torque loads, thereby further reducing noise and improving durability.

SUMMARY OF THE INVENTION

This invention is directed to a helical planetary gear assembly which will solve one or more of the problems noted above. The assembly incorporates a reaction ring gear rigidly secured to a housing, an input sun gear axially and radially located by a bearing, and an axially restrained but radially free output carrier. A jaw clutch is slideable on an output shaft between a high-range position connecting an input shaft to the output shaft, thereby establishing the direct drive mode, and a low-range position connecting the carrier to the output shaft, thereby establishing the reduction drive mode.

The ring gear is pressed into the housing such that it is axially and radially supported. Its thrust loads are transferred directly to the housing. The sun gear is rigidly splined to the input shaft, which is axially and radially supported by a ball bearing. The bearing transfers sun gear thrust loads to the housing where they balance the equal and opposite ring gear thrust loads. The carrier is axially restrained for ease of clutching, but is capable of radially floating for torque load equalization.

In direct drive, torque is transferred from the input shaft directly to the output shaft without loading the gears. This avoids vibration and wear commonly experienced when running locked up.

BRIEF DESCRIPTION OF THE DRAWING

The objects and advantages of this invention will become apparent to those skilled in the art upon careful consideration of the specification herein, including the drawing, wherein.

Figure 1:
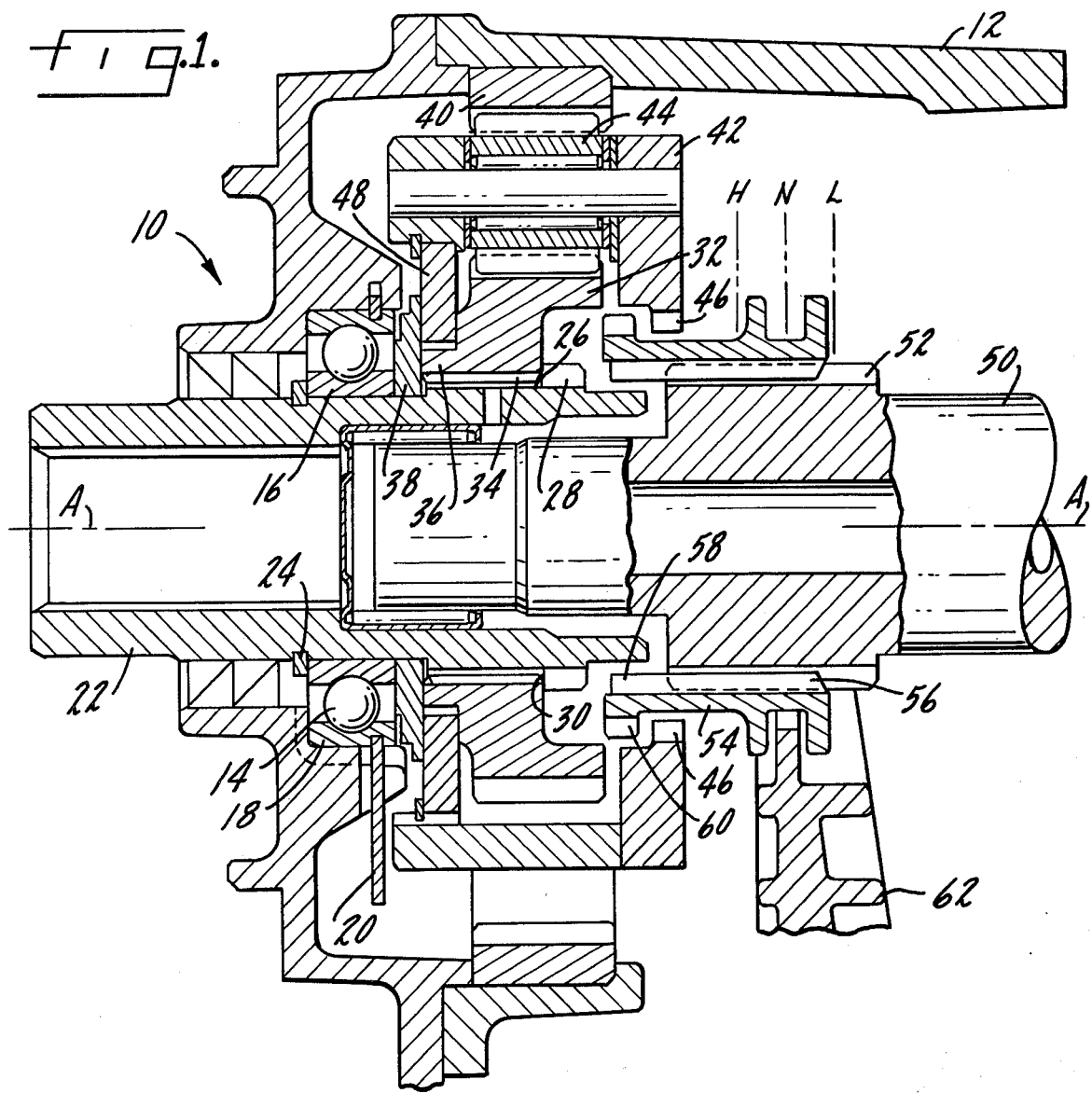
FIG. 1 is a sectional view showing details of the helical planetary gear assembly in the neutral position.

While this invention is susceptible of embodiment in many different forms, there is shown in the drawing and herein will be described in detail a preferred embodiment. It should be understood that the present disclosure is considered to be an exemplification of the principles of the invention, and is not intended to limit the invention to this embodiment.

DESCRIPTION OF A PREFERRED EMBODIMENT

Referring now to the drawing in greater detail, there is shown a helical planetary gear assembly 10. Assembly 10 includes a housing 12 which may be, for example, the housing of an automotive transmission or transfer case.

A suitable bearings 14, preferably a ball bearing, includes an inner race 16 and an outer race 18. A suitable locking ring 20 rigidly secures outer race 18 to housing 12.

A first, input member in the form of an input shaft 22 or the like is journalled in bearing 14 for rotation on an axis A. A suitable locking ring 24 bears against inner race 16 to restrain shaft 22 axially in one direction. Formed on shaft 22 are a spline 26 and clutch teeth 28. Together they define a shoulder 30.

A sun gear 32 includes a spline 34 engaged with spline 26 such that it is secured to input shaft 22 for rotation therewith. Sun gear 32 abuts shoulder 30, and includes an axially extending hub 36. A thrust washer 38 is interposed between sun gear 32 and ball bearing 14. Thrust washer 38 abuts hub 36 and inner race 16, but is spaced from outer race 18. Input shaft 22 is thus restrained in the other axial direction. Bearing 14 also restrains input shaft 22 radially.

A ring gear 40 is rigidly secured to housing 12. Preferably the outer surface of ring gear 40 is partially serrated, and it is pressed into the housing such that it is both axially and radially supported thereby.

A planet carrier 42 rotatably supports a plurality of planet gears 44 in meshing relationship with sun gear 32 and ring gear 40. Gears 32, 40 and 44 have helical gear teeth. Clutch teeth 46 are formed on carrier 42. Carrier 42 includes a locater plate 48 between sun gear 32 and thrust washer 38 and contiguous thereto. Carrier 42 is thus axially restrained. However, as plate 48 has a running fit relative to sun gear 32 and thrust washer 38, carrier 42 is free to float radially.

A second, output member in the form of an output shaft 50 or the like is supported for rotation on axis A. A spline 52 is formed on output shaft 50.

Figure 2:
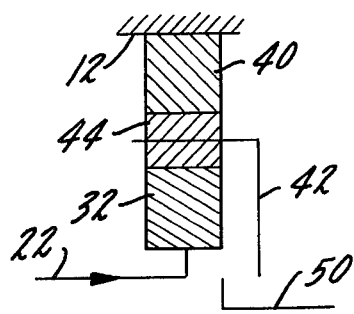
FIG. 2 is a schematic diagram illustrating the assembly in the neutral position.
Figure 3:
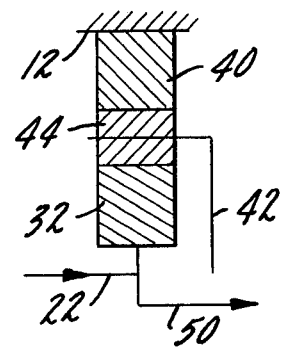
FIG. 3 is a schematic diagram similar to FIG. 2 illustrating the assembly in the high-range position.
Figure 4:
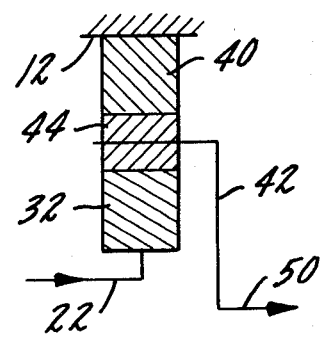
FIG. 4 is a schematic diagram similar to FIG. 2 illustrating the assembly in the low-range position.

A jaw clutch in the form of a collar 54 or the like includes a spline 56 engaged with spline 52 such that collar 54 is rotatable with and axially slidable relative to output shaft 50. Clutch teeth 58 are formed at one end of spline 56. Clutch teeth 60 also are formed on collar 54. Collar 54 is slidable by a suitable shift fork 62 between a neutral position shown in FIG. 1 and illustrated in FIG. 2, a high-range position illustrated in FIG. 3, and a low-range position illustrated in FIG. 4.

In the neutral position, clutch teeth 58 and 60 are spaced from clutch teeth 28 and 46. Output shaft 50 is disengaged from input shaft 22.

In the high-range position, clutch teeth 58 are engaged with clutch teeth 28. Torque is transferred directly from input shaft 22 to output shaft 50, thereby establishing the direct drive mode. As gears 32, 40 and 44 are not loaded in direct drive, no flats are worn on the gear teeth contacts, which flats would otherwise result in severe noise and vibration when assembly 10 is operated in reduction drive.

Plate 48 and sun gear 32 cooperate to restrain carrier 42 from axial movement with collar 54 as assembly 10 is shifted to the low-range position. In the low-range position, clutch teeth 60 are engaged with clutch teeth 46. Torque is transferred from input shaft 22 through the gears to output shaft 50, thereby establishing the reduction drive mode. Ring gear thrust loads are absorbed directly by housing 12. Equal and opposite sun gear thrust loads are transferred through thrust washer 38 and bearing 14 to housing 12, where they are absorbed. Because carrier 42 is free to float radially, it tends to seek a position which equalizes the torque loads on the gears.

Tests have shown that a helical planetary gear assembly of the type disclosed herein, when idling in direct drive, has losses which are so low as to be unmeasurable with conventional instruments. No noise increase over a rotating locked-up gear set was discernable. Finally, no durability problems have appeared.

Although the invention as disclosed herein provides a helical planetary gear assembly particularly adapted for use in association with the transfer case of a four-wheel drive vehicle, it is readily adaptable for use in other environments where similar operating characteristics may be desired.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. A helical planetary gear assembly comprising a housing, a bearing secured to said housing, a first member journalled in said bearing, a second member journalled in said housing for rotation relative to said first member, a sun gear secured to said first member for rotation therewith, a thrust washer abutting with said bearing and sun gear, a ring gear secured to said housing, a planet carrier free to float radially, a plurality of planet gears supported by said carrier in meshing relationship with said sun and ring gears, said gears having helical gear teeth, and a collar engaged with said second member for rotation therewith and axial movement relative thereto, said collar being movable to a high-range position wherein it is engaged with said first member for transferring torque from said first member directly to said second member, said collar being movable to a low-range position wherein it is engaged with said carrier for transferrring torque from said first member through said gears, carrier and collar to said second member, said assembly being constructed and arranged such that when said collar is in its low-range position thrust loads on said ring gear are absorbed directly by said housing, thrust loads on said sun gear are transferred through said bearing to said housing for absorbtion thereby, and torque loads on said gears are balanced.

2. The assembly of claim 1, said carrier including a plate contiguous to said sun gear, said plate and sun gear restraining axial movement of said carrier with said collar as said collar moves toward one of its positions.

3. The assembly of claim 1, said carrier including a plate contiguous to said sun gear and thrust washer, said plate, sun gear and thrust washer restraining axial movement of said carrier.

4. The assembly of claim 3, said plate having a running fit relative to said sun gear and thrust washer, whereby said carrier is free to float radially.

5. The assembly of claim 1, 2, 3 or 4, said collar being movable to a neutral position wherein it is not engaged with said first member or carrier.

6. The assembly of claim 1, 2, 3 or 4, said collar being movable to a neutral position between said sun gear and carrier wherein it is not engaged with said sun gear or carrier.

7. A helical planetary gear assembly comprising a housing, a bearing having inner and outer races, one of said races secured to said housing, a first member journalled by the other of said races and restrained axially in one direction and radially thereby, a second member journalled in said housing, a sun gear secured to said first member and restrained axially in said one direction thereby, a thrust washer contiguous to said other bearing range and said sun gear, said sun gear bearing restrained axially in the other direction by said thrust washer, and said other bearing race a ring gear secured to said housing, a planet carrier free to float radially, a plurality of planet gears supported by said carrier in meshing relationship with said sun and ring gears, said gears having helical gear teeth, and a collar engaged with said second member for rotation therewith and axial movement relative thereto, said collar being movable to a high-range position wherein it is engaged with said first member for transferring torque from said first member directly to said second member, and being movable to a low-range position wherein it is engaged with said carrier for transferring torque from said first member through said gears, carrier and collar to said second member, whereby when said collar is in its low-range position thrust loads on said ring gear are absorbed directly by said housing, thrust loads on said sun gear are transferred either through said thrust washer and said other bearing race or through said first member and said other bearing race to said housing for absorbtion thereby, and torque loads on said gears are balanced.

8. The assembly of claim 7, said carrier including a plate contiguous to said sun gear and said thrust washer, said plate, said gun gear and said thrust washer restraining axial movement of said carrier.

9. The assembly of claim 8, said plate having a running fit relative to said sun gear and said thrust washer, whereby said carrier is free to float radially.

* * * * *

UNITED STATES PATENT AND TRADEMARK OFFICE
CERTIFICATE OF CORRECTION

PATENT NO. : 4,440,042
DATED : April 3, 1984
INVENTOR(S) : John W. Holdeman

It is certified that error appears in the above—identified patent and that said Letters Patent is hereby corrected as shown below:

Column 4, line 39, cancel "range" and insert -- race --.
cancel "bearing" and insert -- being --.

Column 4, line 41, delete the comma (,) after washer
and insert a comma (,) after race.

Column 4, line 64, cancel "gun" and insert -- sun --.

Signed and Sealed this

Twenty-eighth Day of August 1984

[SEAL]

Attest:

GERALD J. MOSSINGHOFF

Attesting Officer

Commissioner of Patents and Trademarks